United States Patent
Uchida et al.

(10) Patent No.: US 12,533,413 B2
(45) Date of Patent: Jan. 27, 2026

(54) VIRUS INACTIVATION METHOD, METHOD FOR MANUFACTURING PROTEIN DRUG, AND SYSTEM FOR PURIFYING SOLUTION

(71) Applicants: NATIONAL UNIVERSITY CORPORATION KOBE UNIVERSITY, Kobe (JP); ABLE Corporation, Tokyo (JP)

(72) Inventors: Kazuhisa Uchida, Kobe (JP); Shutaro Ishikawa, Tokyo (JP); Satoshi Tomita, Tokyo (JP); Kensaku Kanada, Kobe (JP)

(73) Assignees: ABLE CORPORATION, Tokyo (JP); NATIONAL UNIVERSITY CORPORATION KOBE UNIVERSITY, Hyogo (JP)

(*) Notice: Subject to any disclaimer, the term of this patent is extended or adjusted under 35 U.S.C. 154(b) by 400 days.

(21) Appl. No.: 18/212,087

(22) Filed: Jun. 20, 2023

(65) Prior Publication Data

US 2023/0346944 A1 Nov. 2, 2023

Related U.S. Application Data

(63) Continuation of application No. PCT/JP2021/037383, filed on Oct. 8, 2021.

(30) Foreign Application Priority Data

Dec. 24, 2020 (JP) .................. 2020-215590

(51) Int. Cl.
| | |
|---|---|
| A61K 41/17 | (2020.01) |
| A61K 39/39 | (2006.01) |
| A61K 39/395 | (2006.01) |
| A61K 47/22 | (2006.01) |
| C12M 1/00 | (2006.01) |

(52) U.S. Cl.
CPC ............ *A61K 41/17* (2020.01); *A61K 39/395* (2013.01); *A61K 47/22* (2013.01); *C12M 47/10* (2013.01); *C12M 47/16* (2013.01)

(58) Field of Classification Search
CPC ...... A61K 41/17; A61K 39/395; A61K 47/22; C12M 47/10; C12M 47/16
See application file for complete search history.

(56) References Cited

U.S. PATENT DOCUMENTS

| | | | |
|---|---|---|---|
| 2010/0173418 A1* | 7/2010 | Zhou | C07K 16/00 436/86 |
| 2010/0297117 A1* | 11/2010 | Sloey | A61P 7/00 424/130.1 |

(Continued)

FOREIGN PATENT DOCUMENTS

| | | |
|---|---|---|
| JP | H05-049094 A | 6/1993 |
| JP | H11-503601 A | 3/1999 |

(Continued)

OTHER PUBLICATIONS

Extended European Search Report issued in European Patent Application No. 21909891.0 dated Nov. 22, 2024.

(Continued)

*Primary Examiner* — Nicole M Ippolito
(74) *Attorney, Agent, or Firm* — Morgan, Lewis & Bockius LLP

(57) ABSTRACT

A virus inactivation method is provided. The method includes irradiating a solution containing an artificially expressed antibody or antibody fragment with ultraviolet rays in the presence of a radical scavenger. The irradiating only aggregates 5% or less of the antibody or antibody fragment. A wavelength of the ultraviolet rays is 200 nm or longer and 315 nm or shorter. An irradiation amount of the ultraviolet rays is 300 mJ/cm$^2$ or more. An irradiation time of the ultraviolet rays is 3 minutes or less. A concentration of the radical scavenger in the solution is 0.03 mM or more.

12 Claims, 10 Drawing Sheets

(56) References Cited

U.S. PATENT DOCUMENTS

2011/0206680 A1* 8/2011 Valdes .................. A61P 17/00
424/142.1
2014/0329227 A1 11/2014 Ssultz et al.

FOREIGN PATENT DOCUMENTS

| JP | 2009-005589 A | 1/2009 |
|---|---|---|
| JP | 2018-082987 A | 5/2018 |
| WO | 94/28120 A1 | 12/1994 |

OTHER PUBLICATIONS

Lorenz et al., "The Effect of Low Intensity Ultraviolet-C Light on Monoclonal Antibodies," Biotechnology Progress, 25: 476-482 (2009).

Susumu Uchiyama, "Biophysical Characterization of Biopharmaceuticals, Including Antibody Drugs," The Pharmaceutical Society of Japan, Yakugaku Zasshi 136(3): 443-448 (2016) (see English abstract).

Zuorro et al., "Protection of Human Albumin against UV-C Irradiation by Natural Antioxidants," American Journal of Biochemistry and Biotechnology 14 (4): 247-254 (2018).

Tomita, "Protein production in transgenic silk worm cocoons," Journal of Analytical Bio-Science, 37 (3): 159-168 (2014) (see English abstract).

Marx et al., "Protecting fibrinogen with rutin during UVC irradiation for viral inactivation," Photochemistry and Photobiology, 63 (4): 541-546 (1996).

International Search Report issued in corresponding International Patent Application No. PCT/JP2021/037383 dated Dec. 14, 2021.

* cited by examiner

VIRUS INACTIVATION METHOD, METHOD FOR MANUFACTURING PROTEIN DRUG, AND SYSTEM FOR PURIFYING SOLUTION

CROSS-REFERENCE TO RELATED APPLICATION(S)

This application is a continuation of International Patent Application No. PCT/JP2021/037383 filed on Oct. 8, 2021, which claims priority to and the benefit of Japanese Patent Application No. 2020-215590 filed on Dec. 24, 2020, the entire disclosures of which are incorporated herein by reference.

BACKGROUND OF THE INVENTION

Field of the Invention

The present invention relates to a virus inactivation method, a method for manufacturing a protein drug, and a system for purifying a solution.

Description of the Related Art

Antibody drugs have rapidly come into widespread use. In general, proteins such as antibodies to be used as drugs are expressed using a gene recombination technology. However, it is necessary to inactivate viruses used for gene recombination and other extraneous viruses prior to administration of such drugs. Conventionally, acid treatment has been often used to inactivate viruses in antibody drugs (Japanese Patent Laid-Open No. 2018-82987). Japanese Patent Laid-Open No. H11-503601 discloses that viruses in blood factor products are inactivated by ultraviolet irradiation, and Japanese Patent Laid-Open No. 2009-005589 discloses that viruses in vaccines are inactivated by ultraviolet irradiation.

SUMMARY OF THE INVENTION

According to an embodiment of the present invention, a virus inactivation method comprises irradiating a solution containing an artificially expressed antibody or antibody fragment with ultraviolet rays in the presence of a radical scavenger, wherein the irradiating only aggregates 5% or less of the antibody or antibody fragment, a wavelength of the ultraviolet rays is 200 nm or longer and 315 nm or shorter, an irradiation amount of the ultraviolet rays is 300 mJ/cm$^2$ or more, an irradiation time of the ultraviolet rays is 3 minutes or less, and a concentration of the radical scavenger in the solution is 0.03 mM or more.

According to another embodiment of the present invention, a method for manufacturing an antibody drug or an antibody fragment drug comprises: artificially expressing an antibody drug or an antibody fragment drug; and inactivating viruses contained in a solution containing the artificially expressed antibody drug or antibody fragment drug by irradiating the solution with ultraviolet rays in the presence of a radical scavenger, wherein the irradiating only aggregates 5% or less of the antibody or antibody fragment, a wavelength of the ultraviolet rays is 200 nm or longer and 315 nm or shorter, an irradiation amount of the ultraviolet rays is 300 mJ/cm$^2$ or more, an irradiation time of the ultraviolet rays is 3 minutes or less, and a concentration of the radical scavenger in the solution is 0.03 mM or more.

According to still another embodiment of the present invention, a system for purifying a solution containing an artificially expressed antibody or antibody fragment, comprising: a first purification unit configured to purify the solution containing the artificially expressed antibody or antibody fragment by chromatography; a virus inactivation unit configured to irradiate the solution containing the antibody or antibody fragment resulting from the first purification unit with ultraviolet rays in the presence of a radical scavenger, the virus inactivation unit comprising: a channel having an inlet and an outlet for the solution and an ultraviolet-transmitting portion provided in at least a portion between the inlet and the outlet; and a light source configured to emit ultraviolet rays to the ultraviolet-transmitting portion; and a second purification unit configured to further purify, by chromatography, the solution containing the antibody or antibody fragment irradiated with the ultraviolet rays by the inactivation unit, wherein the irradiation of the solution containing the antibody or antibody fragment by the inactivation unit only aggregates 5% or less of the antibody or antibody fragment, a wavelength of the ultraviolet rays is 200 nm or longer and 315 nm or shorter, an irradiation amount of the ultraviolet rays is 300 mJ/cm$^2$ or more, an irradiation time of the ultraviolet rays is 3 minutes or less, and a concentration of the radical scavenger in the solution is 0.03 mM or more, and the outlet of the channel of the inactivation unit is connected to an inlet of a column for the chromatography which the second purification unit comprises.

Further features of the present invention will become apparent from the following description of exemplary embodiments (with reference to the attached drawings).

DESCRIPTION OF THE EMBODIMENTS

Figure 1:
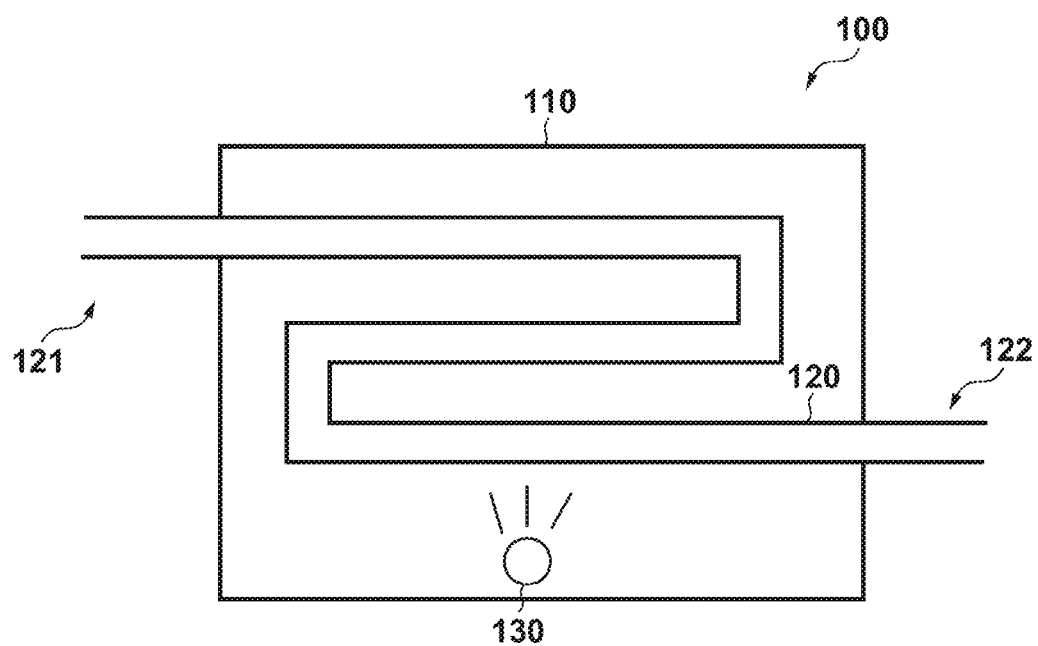
FIG. 1 is a schematic diagram of a virus inactivation apparatus according to an embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

The virus inactivation method using acid treatment has a problem in that it takes time to inactivate viruses because a protein solution needs to be exposed to a low-pH condition for a certain period of time.

In order to use proteins as drugs, a reduction in the amount of protein aggregates is required in addition to sufficient virus inactivation. The generation of protein aggregates may not only reduce the protein content and lead to the formation of minute particles but also boost immunogenicity, and therefore, it is desired to sufficiently reduce the amount of aggregates. In particular, many antibody drugs contain antibodies at high concentrations, and thus a careful consideration is given in the development of antibody drugs (Susumu Uchiyama, "Biophysical Characterization of Biopharmaceuticals, Including Antibody Drugs", YAKUGAKU ZASSHI, 136, p. 443 (2016)).

It has not been clear whether or not the methods of inactivating viruses using ultraviolet rays as disclosed in Japanese Patent Laid-Open No. H11-503601 Japanese Patent Laid-Open No. 2009-005589 are practically available for a solution containing an artificially expressed protein, especially antibody. In particular, it has not been clear whether or not these methods can sufficiently suppress generation of aggregates (e.g., less than 5%) in an artificially expressed protein solution that can often contain viruses used in the manufacturing process, while exhibiting a sufficient virus inactivation effect.

An embodiment of the present invention provides a method for inactivating viruses contained in a protein drug such as an antibody drug while suppressing generation of aggregates.

Virus Inactivation Method

An embodiment of the present invention relates to a virus inactivation method. In this embodiment, an irradiation step of irradiating a solution containing an artificially expressed protein with ultraviolet rays in the presence of a radical scavenger is performed.

The solution containing an artificially expressed protein can be obtained by culturing cells that are artificially modified to express the protein. The cells may be animal cells, plant cells or bacterial cells. The modified cells may be cells that are genetically modified using a method for introducing a gene such as a plasmid encoding the protein, etc. Examples of such cells include Chinese hamster ovary (CHO) cells, E. coli cells, monkey-derived COS cells, and myeloma cells. Also, the modified cells may be hybridomas obtained by fusing cells expressing the protein with cells with proliferative ability, such as myeloma cells. The thus modified cells can express the protein through the intracellular transcription and translation. Specifically, conventionally known methods can be used as the cell modification method. Meanwhile, it is known that such cells often contain exogenous viruses derived from viruses used for, or mixed in during, establishment of the cell line, and the like, or endogenous viruses of the cells.

There is no particular limitation on the culture method and the solution preparation method. For example, a protein-containing solution can be separated from the content in a culture vessel containing cells proliferated by culture and a culture medium. In a specific example, a cell-free protein-containing solution can be obtained by centrifuging the content, or filtering the content through a filter. The protein-containing solution may be further purified. Examples of the purification process include filtration and chromatography, and specific examples of the chromatography include affinity chromatography such as protein A chromatography and ion-exchange chromatography.

The type of protein is not particularly limited, but is an antibody or antibody fragment in one embodiment. Other examples of the protein include a hormone, an enzyme, a cytokine, and an interferon. The protein may also be a protein capable of being used as a drug.

The antibody is, for example, an immunoglobulin such as IgA, IgD, IgE, IgG, or IgM. The type of antibody is not particularly limited, and is, for example, a monoclonal antibody or polyclonal antibody, and may be a humanized antibody, human antibody, or chimeric antibody. The antibody may also be a bispecific antibody.

The antibody fragment is a molecule containing a fragment of an antibody, and has antigen-binding ability. The antibody fragment can contain a portion of an antibody such as the complementarity-determining region, antigen-binding region, or variable region of an antibody. Examples of the antibody fragment include an Fab fragment, an Fab' fragment, an F(ab')$_2$ fragment, and an Fv fragment. The antibody fragment may also be a single-chain antibody or diabody, or a protein having at least a portion of an antigen-binding region (CDR). In another example, the antibody fragment may be an immunoadhesin. Furthermore, the antibody or antibody fragment may also form an antibody-drug complex (ADC) through binding of a drug such as a chemotherapeutic agent thereto, or may be modified using a technique such as PEGylation.

There is no particular limitation on the concentration of the protein in the protein-containing solution. For example, the concentration of the protein in the protein-containing solution may be 0.1 mg/mL or more or 0.5 mg/mL or more, and may be 200 mg/mL or less or 20 mg/mL or less.

There is no particular limitation on viruses to be inactivated. Examples of the viruses include viruses described in "Viral Safety Evaluation of Biotechnology Products Derived from Cell Lines of Human or Animal Origin" (ICH-Q5A, Feb. 22, 2000, Evaluating and Licensing Division of the Pharmaceutical and Medical Safety Bureau Notification No. 329, the Ministry of Health and Welfare). The viruses may also be endogenous viruses of a host organism used in the manufacturing process, exogenous viruses mixed in during the manufacturing process, mammalian viruses, or bacteriophages. Specific examples of the viruses include human immunodeficiency virus-1 (HIV-1), feline immunodeficiency virus (FIV), xenotropic murine leukemia virus (X-MuLV), visna virus, bovine viral diarrhea virus (BVDV), reovirus (reo), poliovirus type 1 (PV-1), encephalomyocarditis (EMC) virus, hepatitis A virus (HAV), sindbis virus, pseudorabies virus (PRV), infectious bovine rhinotracheitis (IBR) virus, herpes simplex virus type 1 (HSV-1), adenovirus such as human adenovirus, adeno-associated virus (AAV), simian virus 40 (SV40), porcine parvovirus (PPV), canine parvovirus (CPV), parvovirus B19, minute virus of mice (MVM), Phi-X 174, Pseudomonas phage PP7, and enterobacterial phage PR772, but there is no limitation thereto.

Examples of the radical scavenger used in this embodiment include substances that allow viruses to be preferentially damaged but reduce or prevent damage to biologics at the time of irradiation with an electromagnetic wave or a particle beam. The radical scavenger may be an agent that acts to scavenge a radical (free radical). The inventors of the present invention presumed that radicals generated due to ultraviolet irradiation facilitated protein aggregation, and then became successful in suppressing generation of aggregates (also including multimers in this specification) by performing ultraviolet irradiation in the presence of the radical scavenger. The radical scavenger may be, for example, an agent that eliminates active oxygen species such as a superoxide anion and a hydroxy radical. Note that, in this specification, radicals include active oxygen species generated by radicals, such as hydrogen peroxide and singlet oxygen, in addition to a hydroxy radical and a superoxide anion, and the radical scavenger also includes substances that scavenge these active oxygen species.

Examples of the radical scavenger include ascorbic acid, edaravone, superoxide dimsutase, bilirubin, glutathione, linoleic acid, tocopherol, carotene, and polyphenols. Examples of the polyphenols include flavonoids, chlorogenic acid, lignan, sesamin, and curcumin, and examples of the flavonoids include catechins, anthocyanins, tannins, rutin, and isoflavone. Examples of the catechins include catechin, epicatechin, and epigallocatechin. Esters or complexes of these substances may be used as the radical scavenger, and, for example, esters of flavonoids or catechins, such as epigallocatechin gallate, can also be used as the radical scavenger. In particular, using a component (e.g., vitamin) that can be administered to a human body in a large amount, such as ascorbic acid or tocopherol, is advantageous because the radical scavenger need not be removed from a protein preparation.

In order to irradiate the protein-containing solution with ultraviolet rays in the presence of the radical scavenger, the radical scavenger can be added to the protein-containing solution prior to ultraviolet irradiation. The concentration of the radical scavenger can be determined depending on the amounts of the protein and the radical scavenger, and may be, for example, 0.03 mM or more or 0.3 mM or more from the viewpoint of further suppressing generation of aggregates. Meanwhile, the concentration of the radical scavenger may be, for example, 10 mM or less or 3 mM or less from the viewpoint of reducing the amount of the radical scavenger in the obtained protein preparation.

As another method of irradiating the protein-containing solution with ultraviolet rays in the presence of the radical scavenger, a radical scavenger immobilized on a carrier can also be used. For example, a container containing a radical scavenger-immobilized carrier and the protein-containing solution may be irradiated with ultraviolet rays.

Ultraviolet rays are light with a wavelength of 10 nm or longer and 400 nm or shorter. In one embodiment, the wavelength of ultraviolet rays is 315 nm or shorter, 300 nm or shorter, 280 nm or shorter, or 260 nm or shorter, in order to improve the virus inactivation efficiency. Meanwhile, the wavelength of ultraviolet rays in one embodiment is 200 nm or longer, 230 nm or longer, or 250 nm or longer for ease of handling, and is, for example, 254 nm, 255 nm, or 259 nm. An ultraviolet fluorescent lamp such as an ultraviolet LED or a cold cathode fluorescent lamp (CCFL), or a laser oscillator such as a KrF excimer laser can be used as an ultraviolet light source. In one embodiment, ultraviolet rays with a maximum wavelength of 200 nm or longer and 315 nm or shorter can be used.

There is no particular limitation on the ultraviolet irradiation method. In one embodiment, a container containing the protein-containing solution can be uniformly irradiated with ultraviolet rays emitted from an ultraviolet light source. The time for which the solution is irradiated with ultraviolet rays may be 1 second or more from the viewpoint of improving the virus inactivation efficiency. The ultraviolet irradiation time may be 3 seconds or more, 15 seconds or more, 45 seconds or more, or 90 seconds or more from the viewpoint of further improving the virus inactivation efficiency. Meanwhile, in one embodiment, viruses may be inactivated by performing ultraviolet irradiation for 60 minutes or less. The ultraviolet irradiation time may be 30 minutes or less, 10 minutes or less, 5 minutes or less, or 3 minutes or less from the viewpoint of further improving the treatment efficiency.

The intensity and the irradiation amount of ultraviolet rays can be set depending on the protein-containing solution, the wavelength of ultraviolet rays, and the ultraviolet irradiation method. In one embodiment, the ultraviolet irradiation amount may be 30 mJ/cm$^2$ or more, 100 mJ/cm$^2$ or more, 300 mJ/cm$^2$ or more, or 600 mJ/cm$^2$ or more from the viewpoint of further improving the virus inactivation efficiency. In one embodiment, the ultraviolet irradiation amount may be 50000 mJ/cm$^2$ or less, 25000 mJ/cm$^2$ or less, 8000 mJ/cm$^2$ or less, 4000 mJ/cm$^2$ or less, or 2500 mJ/cm$^2$ or less from the viewpoint of further improving the treatment efficiency.

In another embodiment, the protein-containing solution flowing in a channel can be continuously irradiated with ultraviolet rays emitted from an ultraviolet light source. In this case, the ultraviolet irradiation time, the ultraviolet irradiation range, or the flow rate of the solution can be set such that, while the solution is flowing, each portion of the solution is irradiated with ultraviolet rays for the above-mentioned irradiation time or with the above-mentioned irradiation amount of ultraviolet rays.

With the ultraviolet irradiation according to this embodiment, 99% or more, 99.9% or more, or 99.99% or more of viruses contained in the protein-containing solution can be inactivated. In one embodiment, performing the ultraviolet irradiation according to this embodiment makes it possible to produce a protein preparation without performing further virus inactivation treatment such as acid treatment. Meanwhile, with the method of performing ultraviolet irradiation in the presence of the radical scavenger according to an embodiment, an increase in an amount of protein aggregates compared to the amount prior to the irradiation can be suppressed to 5% or less, 2% or less, or 1% or less of the total amount of the protein. Also, with the method of performing ultraviolet irradiation in the presence of the radical scavenger according to an embodiment, the amount of protein aggregates in the protein-containing solution after the virus inactivation treatment can be suppressed to 5% or less or 2% or less. In one embodiment, performing the ultraviolet irradiation according to this embodiment makes it possible to produce a protein preparation without any need to perform special treatment for removing protein aggregates. For example, as in one embodiment to be described later, protein purification can be completed by performing ion-exchange chromatography after ultraviolet irradiation.

The virus inactivation method according to this embodiment is especially advantageous for treatment of a protein that is likely to aggregate due to ultraviolet rays. For example, a disulfide bond in a protein is relatively likely to be cleaved by a radical, but it was found that the radical scavenger can be used to suppress aggregation of a protein having a disulfide bond. From this viewpoint, an immunoglobulin or an antibody fragment including an Fab fragment, Fab' fragment, or F(ab')$_2$ fragment in which a heavy chain and a light chain are connected to each other via a disulfide bond can be advantageously used as the protein.

Virus Inactivation Apparatus

A virus inactivation apparatus used to perform the virus inactivation method according to an embodiment will be described with reference to FIG. 1. An inactivation apparatus 100 shown in FIG. 1 includes a housing 110, a channel 120, and a light source 130.

The housing 110 is a case for accommodating most of the channel 120 and the ultraviolet light source 130. The housing 110 may be made of an ultraviolet-opaque material in order to prevent ultraviolet rays from being prevented from exiting to the outside.

The channel 120 is a tube-shaped member through which the protein-containing solution can flow. The channel 120 includes an inlet 121 through which the protein-containing solution flows in, and an outlet 122 through which the ultraviolet-irradiated protein-containing solution flows out. At least a portion of the channel 120 between the inlet 121 and the outlet 122 is formed as an ultraviolet-transmitting portion such that the solution is irradiated with ultraviolet rays. The channel 120 may be made of an ultraviolet-resistant material in order to prevent deterioration caused by ultraviolet rays.

The light source 130 emits ultraviolet rays to the ultraviolet-transmitting portion of the channel 120. With this configuration, the solution flowing in the channel 120 is irradiated with ultraviolet rays emitted from the light source 130. An ultraviolet lamp such as an ultraviolet LED can be used as the light source 130.

In order to inactivate viruses using this inactivation apparatus 100, first, the radical scavenger can be added to the protein-containing solution. Next, the solution to which the radical scavenger has been added can be sent to the inlet 121 of the channel 120 using a pump (not illustrated). Thus, the solution in which viruses are inactivated by ultraviolet rays flows out through the outlet 122.

In another embodiment, a radical scavenger supply line may be connected to the channel 120. In this configuration, the protein-containing solution can be sent to the channel 120. The protein-containing solution and the radical scavenger are mixed with each other inside the channel 120 at a position inside or outside the housing 110, and are then irradiated with ultraviolet rays emitted from the light source 130.

Furthermore, a radical scavenger-immobilized carrier may be provided inside the channel 120. In this case as well, the protein-containing solution can be irradiated with ultraviolet rays in the presence of the radical scavenger inside the channel 120.

The virus inactivation treatment can be continuously performed on the protein-containing solution using the inactivation apparatus 100 shown in FIG. 1, thus making it possible to reduce labor on the inactivation treatment.

Protein Purification Method

A protein purification method using the virus inactivation method according to an embodiment will be described with reference to FIG. 2. For example, a protein drug can be manufactured by artificially expressing a protein drug using a method in which, for example, cells that are genetically modified as described above are used, and performing purification and virus inactivation of this protein drug in accordance with the following method.

In step S210, an unpurified solution is separated from the content in a culture vessel. For example, a supernatant can be separated by centrifuging the content.

In step S220, the unpurified solution obtained in step S210 is purified by chromatography. In step S220, affinity chromatography may be performed. Specifically, protein A chromatography, protein G chromatography, metal affinity chromatography, hydrophobic charge induction chromatography, hydrophobic interaction chromatography, or the like can be performed. In the case of performing protein A chromatography, a glass column or silicic acid column on which protein A is immobilized can be used, for example.

In the affinity chromatography, the unpurified solution obtained in step S210 is loaded on an affinity column, impurities that are not adsorbed by the column are eluted by passing an appropriate washing solvent through the column, and then a protein adsorbed by the column can be eluted by passing an appropriate elution solvent through the column. The specific operations of the affinity chromatography are the same as conventional operations of affinity chromatography.

In step S230, the radical scavenger is added to the purified solution in step S220, and the solution is irradiated with ultraviolet rays. Thus, viruses in the solution are inactivated. The specific method is as described above. Here, as described later, the protein-containing solution flowing through a channel for supplying a solution obtained by purification process in step S220 to a purification process in step S240 may be irradiated with ultraviolet rays.

In step S240, the protein-containing solution irradiated with ultraviolet rays is further purified by chromatography. In step S240, ion-exchange chromatography may be performed. The ion-exchange chromatography may be cation-exchange chromatography or anion-exchange chromatography.

In the ion-exchange chromatography, the ultraviolet-irradiated solution in step S230 is loaded on an ion-exchange column, impurities that are not adsorbed by the column are eluted by passing an appropriate washing solvent through the column, and then a protein adsorbed by the column can be eluted by passing an elution solvent through the column while the pH is changed. The specific operations of the ion-exchange chromatography are the same as conventional operations of ion-exchange chromatography.

In such an embodiment, the protein-containing solution eluted from the column in step S220 can be directly introduced into the inactivation apparatus used for ultraviolet irradiation in step S230. For example, in the case of using the inactivation apparatus 100 shown in FIG. 1, the outlet of the column used in step S220 can be connected to the inlet 121 of the channel 120. Also, the radical scavenger supply line can be connected to the line connecting the outlet of the column used in step S220 and the inlet 121 of the channel 120, or to the channel 120. With this configuration, the elution of the protein from the column used in step S220 and the virus inactivation can be successively performed.

Similarly, the ultraviolet-irradiated solution in step S230 can be directly introduced into the column used in step S240. For example, in the case of using the inactivation apparatus 100 shown in FIG. 1, the outlet 122 of the channel 120 can be connected to the inlet of the column used in step S240. With this configuration, the virus inactivation and loading of the protein on the column used in step S240 can be successively performed.

Labor on the purification process can be reduced by connecting the column used in step S220, the inactivation apparatus used in step S230, and the column used in step S240 in this manner. In one embodiment, another process that is not shown in FIG. 2 can be performed to purify the protein. Meanwhile, the processes of steps S220 to S240 may be successively performed. Also, in one embodiment, a lyophilized preparation capable of being administered to a patient can be manufactured by lyophilizing the protein solution obtained in step S240. Furthermore, a liquid preparation capable of being administered to a patient can be manufactured using the protein solution obtained in step S240.

Figure 2:
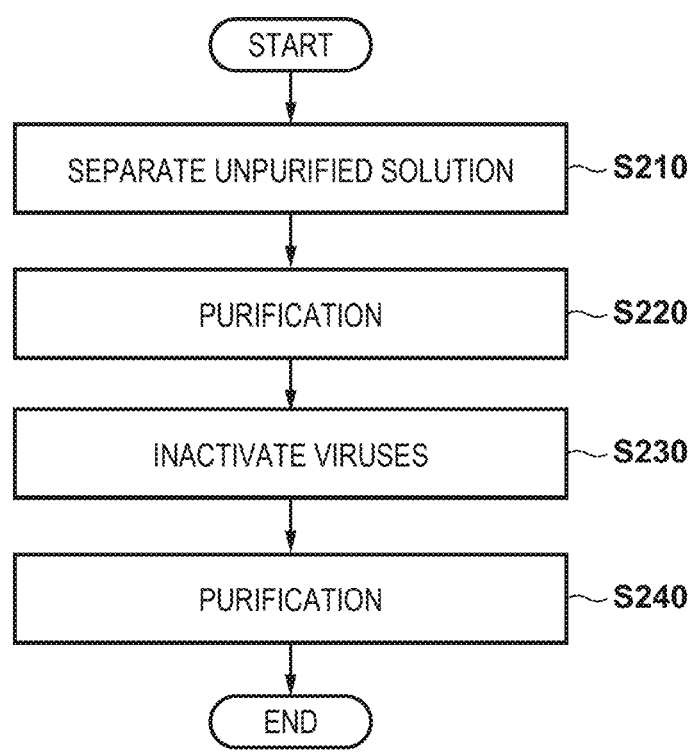
FIG. 2 is a flowchart of a protein purification method according to an embodiment.

In the example shown in FIG. 2, the ultraviolet irradiation (S230) is performed between steps S220 and S240, but the ultraviolet irradiation may be performed at different timing. For example, the processes may be performed in the order of steps S210, S230, S220, and S240. In this case, the unpurified solution obtained in step S210 is irradiated with ultraviolet rays in the presence of the radical scavenger, and is then purified in step S220. Also, the processes may be performed in the order of steps S210, S220, S240, and S230. In this case, the purified protein-containing solution obtained in step S240 is irradiated with ultraviolet rays in the presence of the radical scavenger. As described above, the processes may be performed in different orders, or the ultraviolet irradiation may be performed a plurality of times in the presence of the radical scavenger.

EXAMPLES

Example 1

Virus Inactivation Using Deep Ultraviolet LED in the Presence of Sodium Ascorbate Each of three types of samples, A1 to A3, was irradiated with ultraviolet rays, and the virus inactivation effect and protein aggregation were evaluated. The compositions of the samples A1 to A3 are as follows.

A1: 20 mM citrate buffer (pH 5.2) containing MVM at a final concentration of 5%

A2: 20 mM citrate buffer (pH 5.2) containing IgG at a final concentration of 4 mg/mL and MVM at a final concentration of 5%

A3: 20 mM citrate buffer (pH 5.2) containing IgG at a final concentration of 4 mg/mL, MVM at a final concentration of 5%, and 1 mM sodium ascorbate serving as a radical scavenger The components were prepared as follows. MVM (minute virus of mice, manufactured by ATCC, Catalog No. VR-1346) was amplified from a virus stock using A9 host cells, and was then purified by ultracentrifugation and density gradient centrifugation. The buffer was replaced with DPBS. A9 cells (manufactured by ATCC, Catalog No. CCL-1.4) were used after having been cultured and subcultured in DMEM (containing fetal bovine serum (FBS)). Trastuzumab was used as the IgG. Trastuzumab was cultured using CHO cells, and was then purified by chromatography. The buffer was replaced with 20 mM citrate buffer (pH 5.2).

A deep ultraviolet LED (manufactured by Asahi Kasei Microdevices Corporation, Product No. ENG255-10P-SM) was used for ultraviolet irradiation. This deep ultraviolet LED is an evaluation module with one lamp and a fan, and its peak wavelength is 259 nm.

Each of the sample solutions A1 to A3 was placed in a quartz cell (with two transparent sides), and the quartz cell was placed at a position 5 mm apart from the deep ultraviolet LED light source and irradiated with ultraviolet rays emitted from the deep ultraviolet LED at a constant electric current of 350 mA for 5, 30, 60, or 120 seconds. The irradiation energy of 120-second ultraviolet irradiation was about 850 mJ/cm$^2$ when being measured using an LED-measurement photodiode sensor (manufactured by Ophir, Product No. PD300M-UV) placed at a position 5 mm apart from the deep ultraviolet LED light source.

Evaluation of Inactivation Capacity and Aggregation

A 10-fold serial dilution series of each of the ultraviolet-irradiated samples was prepared using DMEM (containing 2% FBS), and was added to a 96-well plate on which A9 cells had been seeded in advance. The plate was incubated at 37° C. and 5% CO$_2$ for 7 days, and then the infectivity titer (unit: TCID$_{50}$/mL) was calculated by checking cell degeneration.

Figure 3:
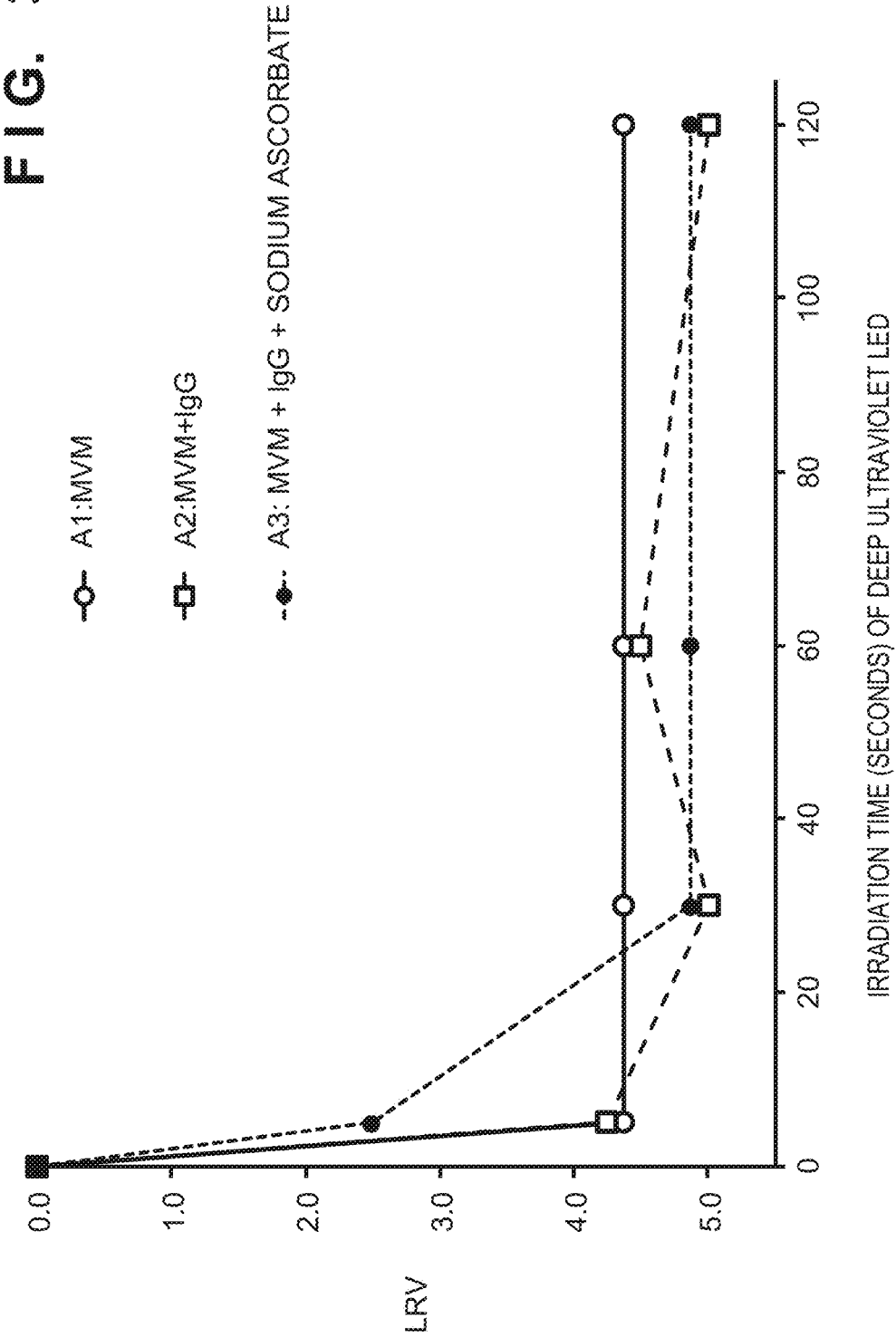
FIG. 3 is a graph showing the results of LRV measurement in Example 1.

For each sample, LRV (Log Reduction Value) was calculated by subtracting the common logarithm of the infectivity titer after irradiation from the common logarithm of the infectivity titer when the irradiation time was 0 seconds (no irradiation). FIG. 3 and Table 1 show the LRVs with respect to the irradiation times for the samples.

TABLE 1

| Deep ultraviolet LED irradiation time (second) | LRV (n = 1) | | |
|---|---|---|---|
| | A1 MVM | A2 MVM + IgG | A3 MVM + IgG + sodium ascorbate |
| 0 | 0 | 0 | 0 |
| 5 | >4.38 | 4.25 | 2.50 |
| 30 | >4.38 | >5.00 | >4.88 |
| 60 | >4.38 | 4.50 | >4.88 |
| 120 | >4.38 | >5.00 | >4.88 |

It was found from these results that 4 Log (99.99%) or more of MVM could be inactivated whether or not sodium ascorbate was added. In particular, in the case of adding sodium ascorbate, the virus inactivation effect was increased depending on the ultraviolet irradiation amount when the ultraviolet irradiation amount was relatively small. Meanwhile, it was found that viruses were inactivated to the same extent as the case of adding no sodium ascorbate, by performing ultraviolet irradiation for 30 seconds or more (about 213 mJ/cm$^2$ or more).

Figure 4:
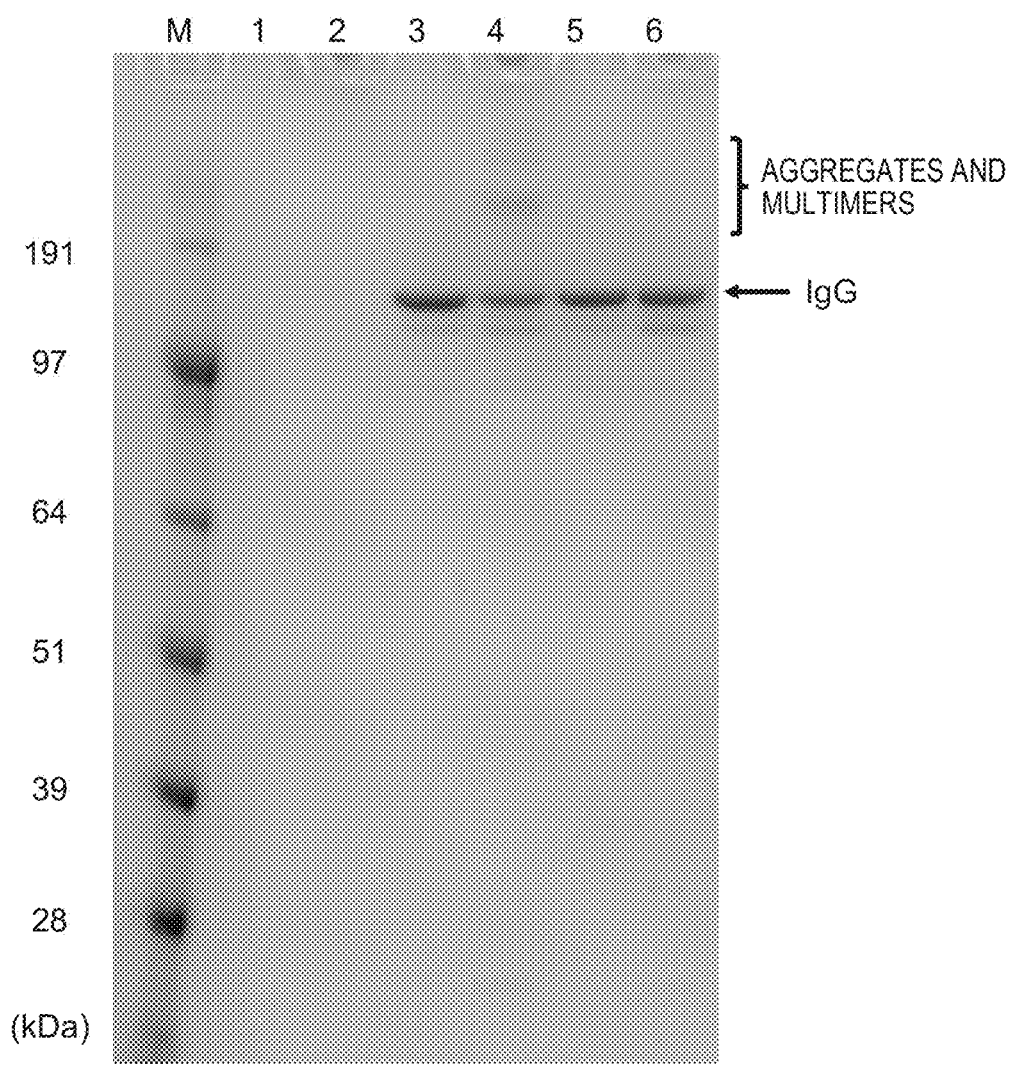
FIG. 4 is a diagram showing the result of SDS-PAGE in Example 1.

Also, the degrees of aggregation and multimerization of IgG in the ultraviolet-irradiated samples were evaluated by SDS-PAGE. FIG. 4 is a photograph of an SDS-PAGE gel, and the lanes show the results from the following samples.

Lane 1: Sample A1 (only MVM, irradiation time: 0 seconds)

Lane 2: Sample A1 (only MVM, irradiation time: 120 seconds)

Lane 3: Sample A2 (MVM+IgG, irradiation time: 0 seconds)

Lane 4: Sample A2 (MVM+IgG, irradiation time: 120 seconds)

Lane 5: Sample A3 (MVM+IgG+sodium ascorbate, irradiation time: 0 seconds)

Lane 6: Sample A3 (MVM+IgG+sodium ascorbate, irradiation time: 120 seconds)

As shown in FIG. 4, in the case of performing the ultraviolet irradiation without adding the radical scavenger (Lane 4), the presence of aggregates or multimers of IgG was observed. Meanwhile, in the case of adding the radical scavenger and then performing the ultraviolet irradiation (Lane 6), these impurities were not detected.

Example 2

Evaluation of Aggregation of IgG Caused by Ultraviolet Irradiation in the Presence of Various Radical Scavengers Each of four types of samples, B1 to B4, was irradiated with ultraviolet rays, and protein aggregation was evaluated. The compositions of the samples B1 to B4 are as follows. The IgG preparation method is the same as that in Example 1.

B1: 20 mM citrate buffer (pH 5.2) containing IgG at a final concentration of 4 mg/mL B2: 20 mM citrate buffer (pH 5.2) containing IgG at a final concentration of 4 mg/mL and 1 mM sodium ascorbate serving as a radical scavenger B3: 20 mM citrate buffer (pH 5.2) containing IgG at a final concentration of 4 mg/mL and 1 mM edaravone serving as a radical scavenger B4: 20 mM citrate buffer (pH 5.2) containing IgG at a final concentration of 4 mg/mL and 0.1 mM epigallocatechin gallate serving as a radical scavenger Each of the samples was irradiated with ultraviolet rays emitted from the deep ultraviolet LED using the same method as that in Example 1. For each of the samples after the irradiation, aggregates and multimers of IgG were quantified by gel filtration chromatography using Agilent 1260 (HPLC, manufactured by Agilent) and a TSKgel G3000SWXL column (manufactured by Tosoh Corporation). Table 2 shows the results. Table 2 shows the area % of the peaks corresponding to the aggregates and multimers on a high molecular weight side with respect to all the IgG-derived peaks, which was calculated from the gel filtration chromatogram.

TABLE 2

| Aggregates and multimers (%) | | | | |
|---|---|---|---|---|
| B1 no radical scavenger added | | B2 | B3 | B4 |
| no irradiation | deep ultraviolet irradiation | 1 mM sodium ascorbate | 1 mM edaravone | 0.1 mM epigallocatechin gallate |
| 1.43 | 22.80 | 1.82 | 1.70 | 1.53 |

Table 2 shows that, in the case of performing the ultraviolet irradiation in the absence of the radical scavenger, a lot of aggregates or multimers of IgG, as large as 20% or more, were generated. Meanwhile, it was confirmed that, in the case of performing the ultraviolet irradiation in the presence of the radical scavenger, the generation of aggregates and multimers of IgG was suppressed, and the amount thereof was sufficiently small compared with the amount of aggregates and multimers of IgG contained before the ultraviolet irradiation. In the case of adding the radical scavenger, the amount of aggregates and multimers was 2% or less, and the increment was 0.5% or less.

Examples 1 and 2 showed that performing ultraviolet irradiation in the presence of the radical scavenger made it possible to prevent protein aggregation (e.g., 2% or less) while achieving sufficient virus inactivation (e.g., 4 Log or more).

Example 3

Evaluation of Virus Inactivation and Aggregation Using Different Deep Ultraviolet LED in the Presence of Radical Scavenger Each of five types of samples, A1 to A5, was irradiated with ultraviolet rays, and the virus inactivation effect and protein aggregation were evaluated.

Samples A1 to A3 are the same as those in Example 1. The compositions of Samples A4 and A5 are as follows, and the method of preparing MVM to be used and the method of preparing IgG to be used are the same as those in Example 1.

A4: 20 mM citrate buffer (pH 5.2) containing IgG at a final concentration of 4 mg/mL, MVM at a final concentration of 5%, and 1 mM edaravone serving as a radical scavenger A5: 20 mM citrate buffer (pH 5.2) containing IgG at a final concentration of 4 mg/mL, MVM at a final concentration of 5%, and 0.1 mM epigallocatechin gallate serving as a radical scavenger A deep ultraviolet LED (manufactured by DOWA Electronics Materials Co., Ltd., Product No. 255-FL-01-U04) was used for ultraviolet irradiation. This deep ultraviolet LED is a deep ultraviolet LED with a heat sink and a fan, and its peak wavelength is 255 nm.

Each of the sample solutions A1 to A5 was placed in a quartz cell (with two transparent sides), and the quartz cell was placed at a position 5 mm apart from the deep ultraviolet LED light source and irradiated with ultraviolet rays emitted from the deep ultraviolet LED at a constant electric current of 300 mA for 5, 30, or 60 seconds. The irradiation energy was measured using an LED-measurement photodiode sensor (manufactured by Ophir, Product No. PD300M-UV) placed at a position 5 mm apart from the deep ultraviolet LED light source. The irradiation energies for the irradiation times of 5 seconds, 30 seconds, and 60 seconds were about 61 mJ/cm$^2$, 403 mJ/cm$^2$, and 815 mJ/cm$^2$, respectively.

Figure 5:
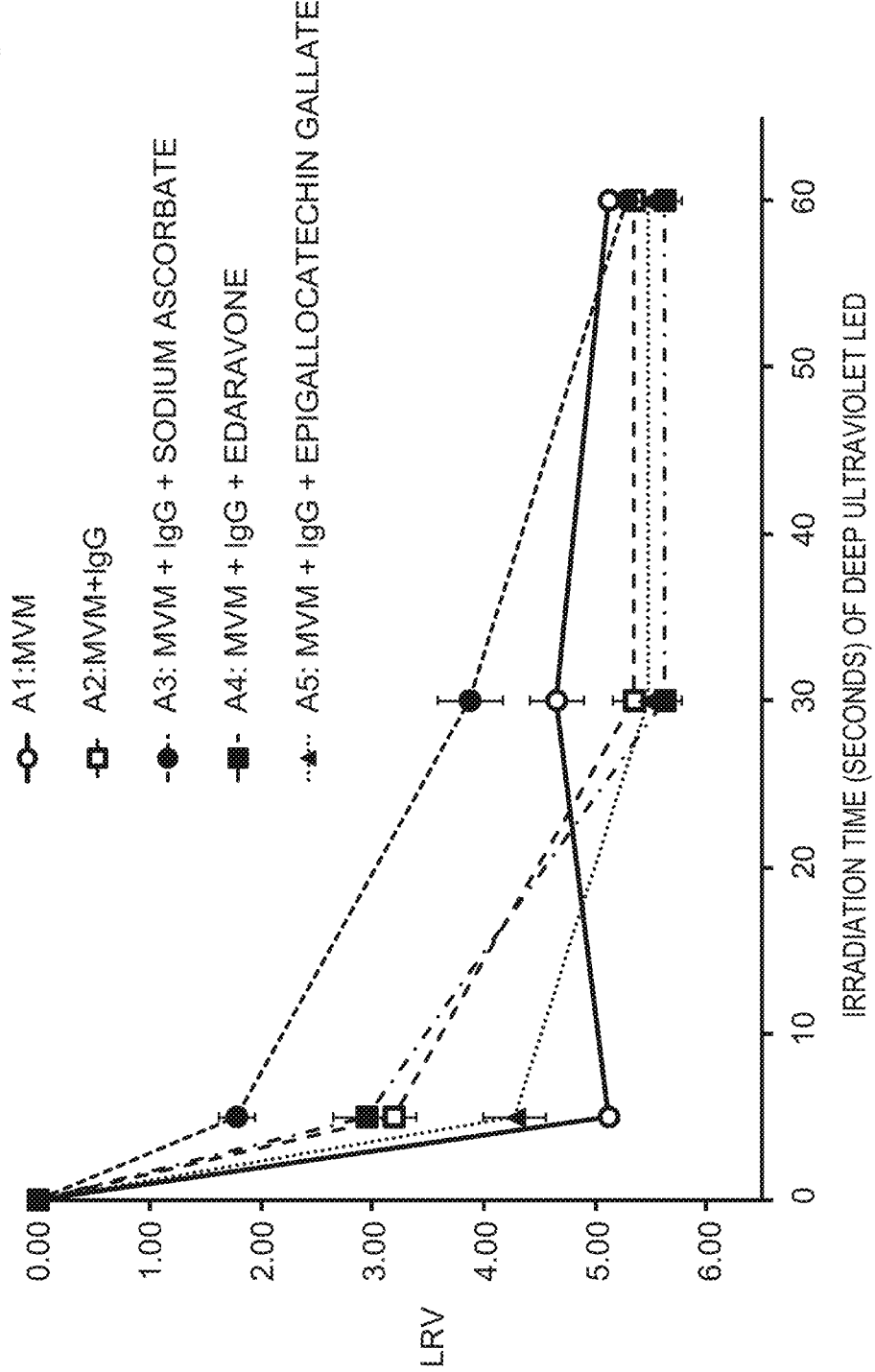
FIG. 5 is a graph showing the results of LRV measurement in Example 3.

A 10-fold serial dilution series of each of the ultraviolet-irradiated samples was prepared using DMEM (containing 2% FBS), and was added to a 96-well plate on which A9 cells had been seeded in advance. The plate was incubated at 37° C. and 5% CO$_2$ for 5 to 6 days, and then the infectivity titer (unit: TCID$_{50}$/mL) was calculated by checking cell degeneration. LRV was calculated based on the calculated infectivity titer in the same manner as in Example 1. FIG. 5 and Table 3 show the LRVs with respect to the irradiation times for the samples.

TABLE 3

| Deep ultraviolet LED irradiation time (second) | UV Dose (mJ/cm$^2$) | LRV (n = 4) | | | | |
|---|---|---|---|---|---|---|
| | | A1 MVM | A2 MVM + IgG | A3 MVM + IgG + sodium ascorbate | A4 MVM + IgG + edaravone | A5 MVM + IgG + epigallocatechin gallate |
| 0 | 0 | 0.00 | 0.00 | 0.00 | 0.00 | 0.00 |
| 5 | 61.59 | ≥5.13 | 3.19 ± 0.20 | 1.78 ± 0.16 | 2.94 ± 0.29 | 4.28 ± 0.28 |
| 30 | 403.9 | 4.66 ± 0.24 | ≥5.35 | 3.88 ± 0.29 | ≥5.63 | ≥5.47 |
| 60 | 815.2 | ≥5.13 | ≥5.35 | ≥5.28 | ≥5.63 | ≥5.47 |

It was found from these results that 5 Log (99.999%) or more of MVM could be inactivated whether or not the radical scavenger was added. In particular, the virus inactivation effect was increased depending on the ultraviolet irradiation amount when the ultraviolet irradiation amount was relatively small, but 5 Log or more of MVM could be inactivated by performing the irradiation for a sufficiently long period of time. Also, it was found that viruses were inactivated to the same extent as the case of adding no radical scavenger added, by performing ultraviolet irradiation for 60 seconds or more (about 815 mJ/cm² or more) even in the presence of the radical scavenger. In particular, in the case of using edaravone or epigallocatechin gallate as the radical scavenger, 5 Log or more of MVM could be inactivated by performing ultraviolet irradiation for 30 seconds or more (about 403 mJ/cm² or more).

Figure 6:
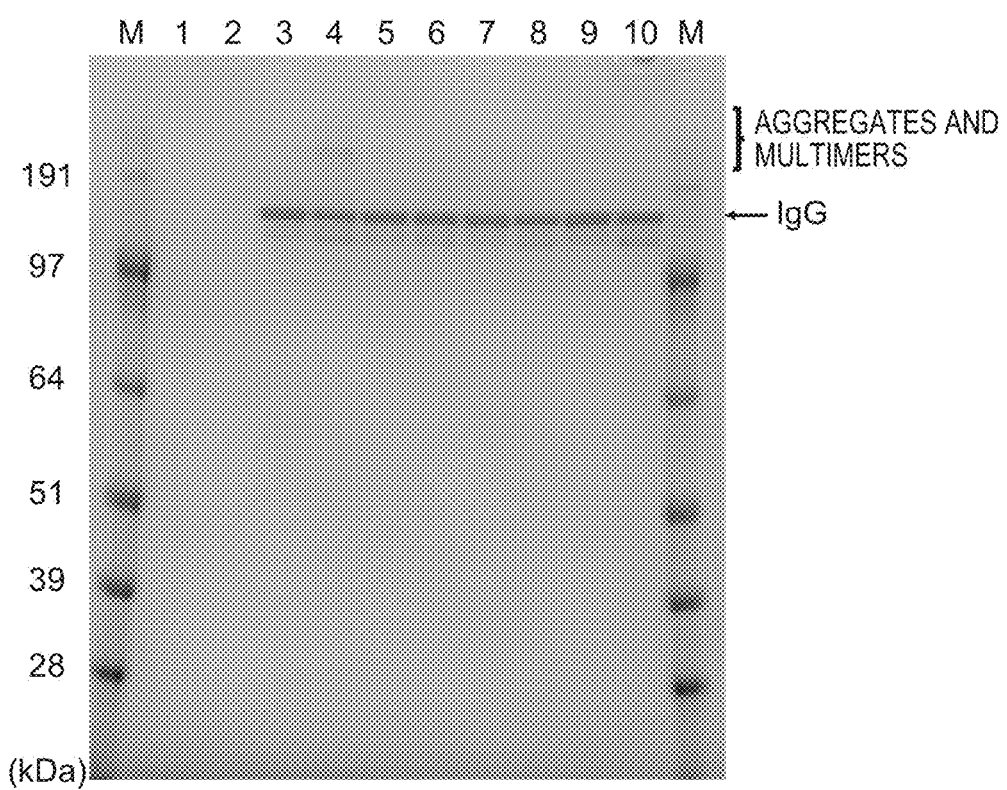
FIG. 6 is a diagram showing the result of SDS-PAGE in Example 3.

Furthermore, aggregation of IgG in the samples A1 to A5 was evaluated by SDS-PAGE in the same manner as in Example 1. FIG. 6 is a photograph of an SDS-PAGE gel, and the lanes show the results from the following samples.

Lane 1: Sample A1 (only MVM, irradiation time: 0 seconds)
Lane 2: Sample A1 (only MVM, irradiation time: 60 seconds)
Lane 3: Sample A2 (MVM+IgG, irradiation time: 0 seconds)
Lane 4: Sample A2 (MVM+IgG, irradiation time: 60 seconds)
Lane 5: Sample A3 (MVM+IgG+sodium ascorbate, irradiation time: 0 seconds)
Lane 6: Sample A3 (MVM+IgG+sodium ascorbate, irradiation time: 60 seconds)
Lane 7: Sample A4 (MVM+IgG+edaravone, irradiation time: 0 seconds)
Lane 8: Sample A4 (MVM+IgG+edaravone, irradiation time: 60 seconds)
Lane 9: Sample A5 (MVM+IgG+epigallocatechin gallate, irradiation time: 0 seconds)
Lane 10: Sample A5 (MVM+IgG+epigallocatechin gallate, irradiation time: 60 seconds)

As shown in FIG. 6, in the case of performing the ultraviolet irradiation without adding the radical scavenger (Lane 4), the presence of aggregates or multimers of IgG was observed. Meanwhile, in the case of adding the radical scavenger and then performing the ultraviolet irradiation (Lanes 6, 8, and 10), these impurities were not detected.

As described above, in this example as well, it was confirmed that performing ultraviolet irradiation in the presence of the radical scavenger made it possible to maintain protein aggregation at a level that is not detected by SDS-PAGE while achieving sufficient virus inactivation (e.g., 5 Log or more).

Example 4

Evaluation of Virus Inactivation and Aggregation in Sample Solutions Containing IgG at Various Concentrations Each of eight types of samples was irradiated with ultraviolet rays, and the virus inactivation effect and protein aggregation were evaluated. Samples A1 to A3 among the samples used in this example are the same as those in Example 1. The compositions of Samples A6 to A10 are as follows, and the method of preparing MVM to be used and the method of preparing IgG to be used are the same as those in Example 1.

A6: 20 mM citrate buffer (pH 5.2) containing IgG at a final concentration of 1 mg/mL and MVM at a final concentration of 5%
A7: 20 mM citrate buffer (pH 5.2) containing IgG at a final concentration of 10 mg/mL and MVM at a final concentration of 5%
A8: 20 mM citrate buffer (pH 5.2) containing MVM at a final concentration of 5% and 1 mM sodium ascorbate serving as a radical scavenger
A9: 20 mM citrate buffer (pH 5.2) containing IgG at a final concentration of 1 mg/mL, MVM at a final concentration of 5%, and 1 mM sodium ascorbate serving as a radical scavenger
A10: 20 mM citrate buffer (pH 5.2) containing IgG at a final concentration of 10 mg/mL, MVM at a final concentration of 5%, and 1 mM sodium ascorbate serving as a radical scavenger A deep ultraviolet LED (manufactured by DOWA Electronics Materials Co., Ltd., Product No. 280-FL-02-U04, peak wavelength: 280 nm) was used for ultraviolet irradiation.

Each of the sample solutions A1 to A3 and A6 to A10 was placed in a quartz cell (with two transparent sides) and the quartz cell was placed at a position 5 mm apart from the deep ultraviolet LED light source and irradiated with ultraviolet rays emitted from the deep ultraviolet LED for 60 seconds. The irradiation energy of 60-second ultraviolet irradiation was about 750 mJ/cm² when being measured using an LED-measurement photodiode sensor (manufactured by Ophir, Product No. PD300M-UV) placed at a position 5 mm apart from the deep ultraviolet LED light source.

For each of the irradiated samples, aggregates and multimers of IgG were quantified by gel filtration chromatography in the same manner as in Example 2. Table 4 shows the results. Also, for each of the irradiated samples, the infectivity titer and LRV were calculated in the same manner as in Example 1. Table 4 shows the obtained LRVs.

TABLE 4

| Sample | | LRV (n = 4) | Aggregates and multimers (%) |
|---|---|---|---|
| A1 | MVM | ≥5.25 | — |
| A6 | MVM + 1 mg/mL IgG | ≥5.66 | 23.9 |
| A2 | MVM + 4 mg/mL IgG | ≥4.84 | 24.0 |
| A7 | MVM + 10 mg/mL IgG | ≥5.28 | 12.5 |
| A8 | MVM + sodium ascorbate | 5.50 ± 0.20 | — |
| A9 | MVM + 1 mg/mL IgG + sodium ascorbate | 5.28 ± 0.18 | 1.98 |
| A3 | MVM + 4 mg/mL IgG + sodium ascorbate | 5.22 ± 0.05 | 1.80 |
| A10 | MVM + 10 mg/mL IgG + sodium ascorbate | 5.09 ± 0.50 | 1.77 |

It was found from these results that 4 Log (99.99%) or more of MVM could be inactivated irrespective of the IgG concentration even in the case of irradiation with ultraviolet rays with a peak wavelength of 280 nm. In the case of adding no sodium ascorbate, aggregates or multimers of IgG were generated in an amount of 10% to 20% or more by the ultraviolet irradiation, but adding sodium ascorbate made it possible to suppress the amount of aggregates or multimers of IgG to 2% or less while maintaining the virus inactivation effect.

Figure 7:
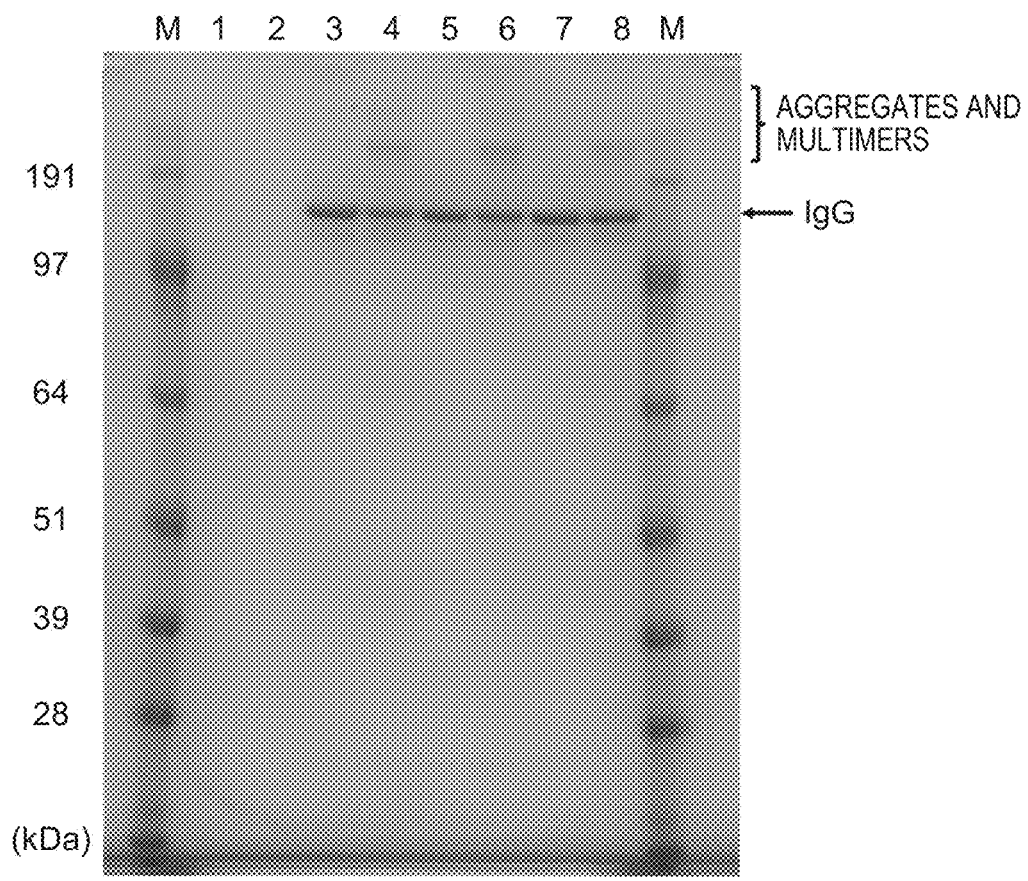
FIG. 7 is a diagram showing the result of SDS-PAGE in Example 4.

Also, the degrees of aggregation and multimerization of IgG in the ultraviolet-irradiated samples were evaluated by SDS-PAGE. FIG. 7 is a photograph of an SDS-PAGE gel, and the lanes show the results from the following samples.

Lane 1: Sample A1 (only MVM, before irradiation)
Lane 2: Sample A1 (only MVM, after irradiation)
Lane 3: Sample A6 (MVM+IgG 1 mg/mL, before irradiation)
Lane 4: Sample A6 (MVM+IgG 1 mg/mL, after irradiation)
Lane 5: Sample A2 (MVM+IgG 4 mg/mL, before irradiation)

Lane 6: Sample A2 (MVM+IgG 4 mg/mL, after irradiation)
Lane 7: Sample A7 (MVM+IgG 10 mg/mL, before irradiation)
Lane 8: Sample A7 (MVM+IgG 10 mg/mL, after irradiation)

Figure 8:
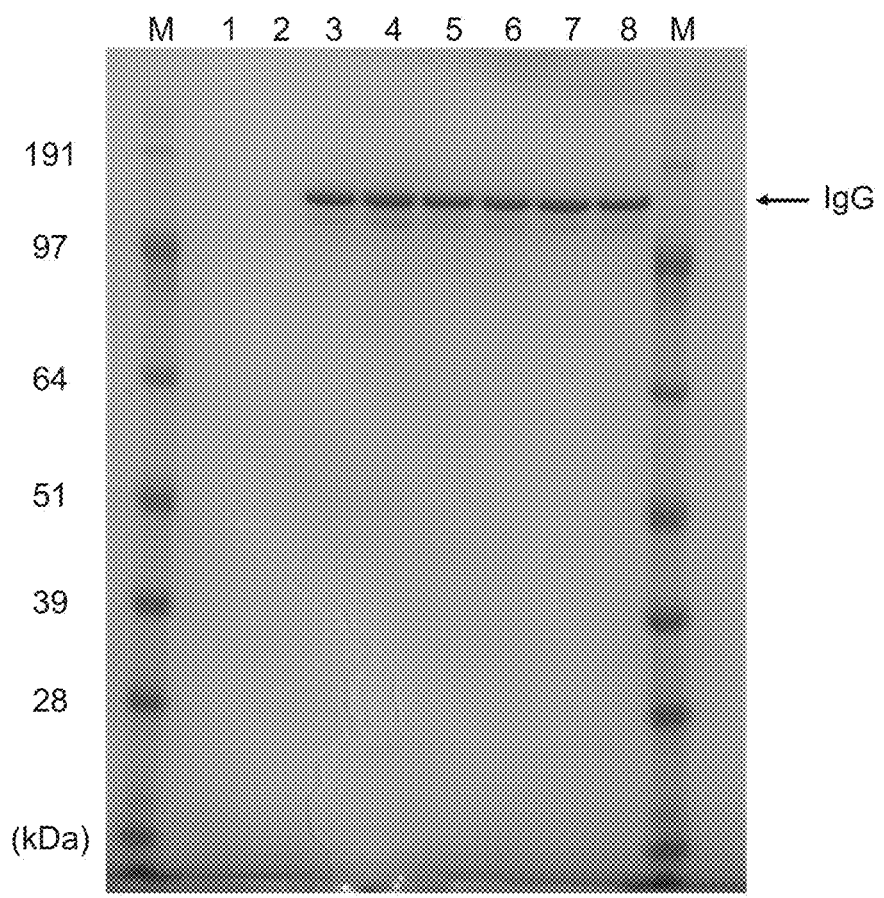
FIG. 8 is a diagram showing the result of SDS-PAGE in Example 4.

FIG. 8 is also a photograph of an SDS-PAGE gel, and the lanes show the results from the following samples.
Lane 1: Sample A8 (MVM+sodium ascorbate, before irradiation)
Lane 2: Sample A8 (MVM+sodium ascorbate, after irradiation)
Lane 3: Sample A9 (MVM+IgG 1 mg/mL+sodium ascorbate, before irradiation)
Lane 4: Sample A9 (MVM+IgG 1 mg/mL+sodium ascorbate, after irradiation)
Lane 5: Sample A3 (MVM+IgG 4 mg/mL+sodium ascorbate, before irradiation)
Lane 6: Sample A3 (MVM+IgG 4 mg/mL+sodium ascorbate, after irradiation)
Lane 7: Sample A10 (MVM+IgG 10 mg/mL+sodium ascorbate, before irradiation)
Lane 8: Sample A10 (MVM+IgG 10 mg/mL+sodium ascorbate, after irradiation)

As shown in FIG. 7, in the case of performing the ultraviolet irradiation without adding the radical scavenger (Lanes 4, 6, and 8), the presence of aggregates or multimers of IgG was observed. Meanwhile, as shown in FIG. 8, in the case of adding the radical scavenger and then performing the ultraviolet irradiation (Lanes 4, 6, and 8), these impurities were not detected.

As described above, it was confirmed that, even in the case of using ultraviolet rays different in the wavelength from ultraviolet rays used in Examples 1 to 3, performing ultraviolet irradiation in the presence of the radical scavenger made it possible to maintain protein aggregation at a level that is not detected by SDS-PAGE while achieving sufficient virus inactivation.

Example 5

Evaluation of Continuous Virus Inactivation and Aggregation

Samples A7 and A10, which are the same as those in Example 4, were irradiated with ultraviolet rays, and the virus inactivation effect and protein aggregation were evaluated.

A deep ultraviolet LED (manufactured by Stanley Electric Co., Ltd., peak wavelength: 280 nm) was used for ultraviolet irradiation. An in-line flow cell (with two translucent sides) was installed at a position 8 mm apart from the deep ultraviolet LED light source. Then, the sample solution was continuously supplied to the in-line flow cell using a peristaltic pump through a tube that was connected to the in-line flow cell such that the sample solution passed through the in-line flow cell. The flow rate of the sample solution was about 0.38 mL/min, and the irradiation energy applied to the sample solution in this condition was about 1000 mJ/cm$^2$.

For each of the irradiated samples, aggregates and multimers of IgG were quantified by gel filtration chromatography in the same manner as in Example 2. Table 5 shows the results. Also, for each of the irradiated samples, the infectivity titer and LRV were calculated in the same manner as in Example 1. Table 5 shows the obtained LRVs.

TABLE 5

| Sample | | LRV (n = 2) | Aggregates and multimers (%) |
| --- | --- | --- | --- |
| A7 | MVM + 10 mg/mL IgG | ≥4.19 | 21.5 |
| A10 | MVM + 10 mg/mL IgG + sodium ascorbate | 4.06 ± 0.19 | 1.01 |

It was found from these results that 4 Log (99.99%) or more of MVM could be inactivated even in the case of continuously irradiating the sample solution flowing in the in-line flow cell with ultraviolet rays. In the case of adding no sodium ascorbate, aggregates or multimers of IgG were generated in an amount of 20% or more by the ultraviolet irradiation, but adding sodium ascorbate made it possible to suppress the amount of aggregates or multimers of IgG to 2% or less while maintaining the virus inactivation effect.

Figure 9:
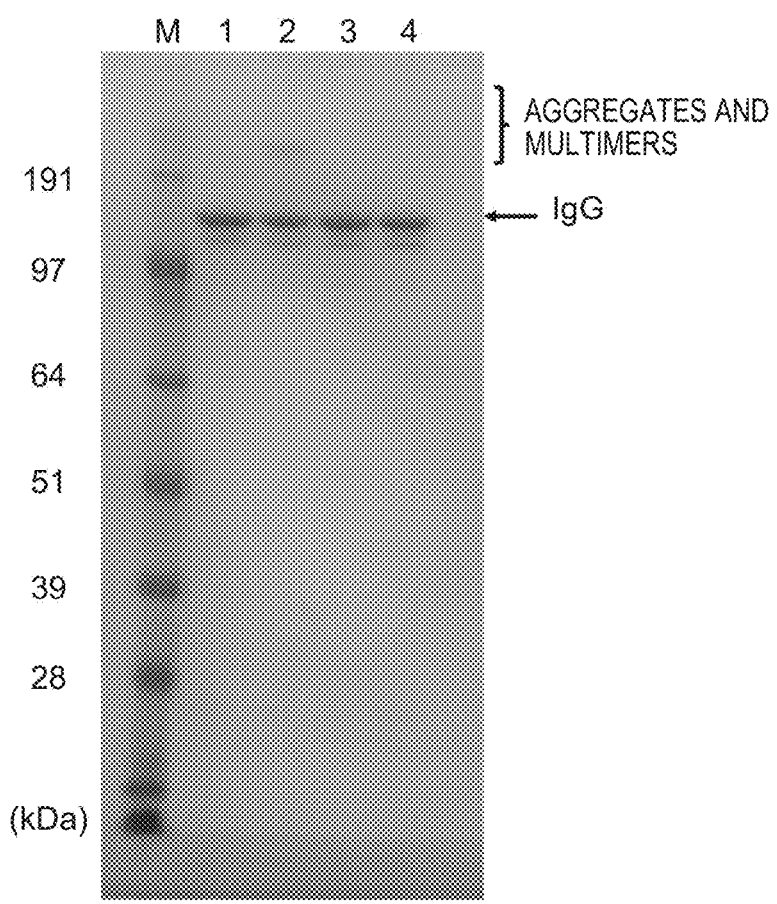
FIG. 9 is a diagram showing the result of SDS-PAGE in Example 5.

Also, the degrees of aggregation and multimerization of IgG in the ultraviolet-irradiated samples were evaluated by SDS-PAGE. FIG. 9 is a photograph of an SDS-PAGE gel, and the lanes show the results from the following samples.
Lane 1: Sample A7 (MVM+IgG 10 mg/mL, before irradiation)
Lane 2: Sample A7 (MVM+IgG 10 mg/mL, after irradiation)
Lane 3: Sample A10 (MVM+IgG 10 mg/mL+sodium ascorbate, before irradiation)
Lane 4: Sample A10 (MVM+IgG 10 mg/mL+sodium ascorbate, after irradiation)

As shown in FIG. 9, in the case of performing the ultraviolet irradiation without adding the radical scavenger (Lane 2), the presence of aggregates or multimers of IgG was observed. Meanwhile, in the case of adding the radical scavenger and then performing the ultraviolet irradiation (Lane 4), these impurities were not detected.

As described above, it was confirmed that, even in the case of continuously irradiating the sample solution flowing in the in-line flow cell with ultraviolet rays, using the radical scavenger made it possible to maintain protein aggregation at a level that is not detected by SDS-PAGE while achieving sufficient virus inactivation.

Example 6

Evaluation of Virus Inactivation and Aggregation in Different Protein Solutions

Each of two types of samples, C1 and C2, was irradiated with ultraviolet rays, and the virus inactivation effect and protein aggregation were evaluated. The compositions of Samples C1 and C2 are as follows, and the method of preparing MVM to be used is the same as that in Example 1. In this example, cetuximab (manufactured by Bio X Cell, Product No. SIM0002), one type of IgG, was used as the protein.

C1: 31.9 mM phosphate buffer (pH 7.0) containing IgG at a final concentration of 1 mg/mL and MVM at a final concentration of 5%

C2: 31.9 mM phosphate buffer (pH 7.0) containing IgG at a final concentration of 1 mg/mL, MVM at a final concentration of 5%, and 1 mM sodium ascorbate serving as a radical scavenger A deep ultraviolet LED (manufactured by DOWA Electronics Materials Co., Ltd., Product No. 280-FL-02-U04, peak wavelength: 280 nm) was used for ultraviolet irradiation.

Each of the sample solutions C1 and C2 was placed in a quartz cell (with two transparent sides), and the quartz cell was placed at a position 5 mm apart from the deep ultraviolet LED light source and irradiated with ultraviolet rays emitted from the deep ultraviolet LED for 60 seconds. The irradiation energy of 60-second ultraviolet irradiation was about 769 mJ/cm$^2$ when being measured using an LED-measurement photodiode sensor (manufactured by Ophir, Product No. PD300M-UV) placed at a position 5 mm apart from the deep ultraviolet LED light source.

For each of the irradiated samples, aggregates and multimers of IgG were quantified by gel filtration chromatography in the same manner as in Example 2. Table 6 shows the results. Also, for each of the irradiated samples, the infectivity titer and LRV were calculated in the same manner as in Example 1. Table 6 shows the obtained LRVs.

TABLE 6

| Sample | | LRV (n = 1) | Aggregates and multimers (%) |
|---|---|---|---|
| C1 | MVM + 1 mg/mL IgG | 4.38 | 36.7 |
| C2 | MVM + 1 mg/mL IgG + sodium ascorbate | 4.13 | 1.86 |

It was found from these results that 4 Log (99.99%) or more of MVM could be inactivated even in the case of irradiating the various protein solutions with ultraviolet rays. In the case of adding no sodium ascorbate, aggregates or multimers of the protein were generated in an amount of 20% or more by the ultraviolet irradiation, but adding sodium ascorbate made it possible to suppress the amount of aggregates or multimers of the protein to 2% or less while maintaining the virus inactivation effect.

Figure 10:
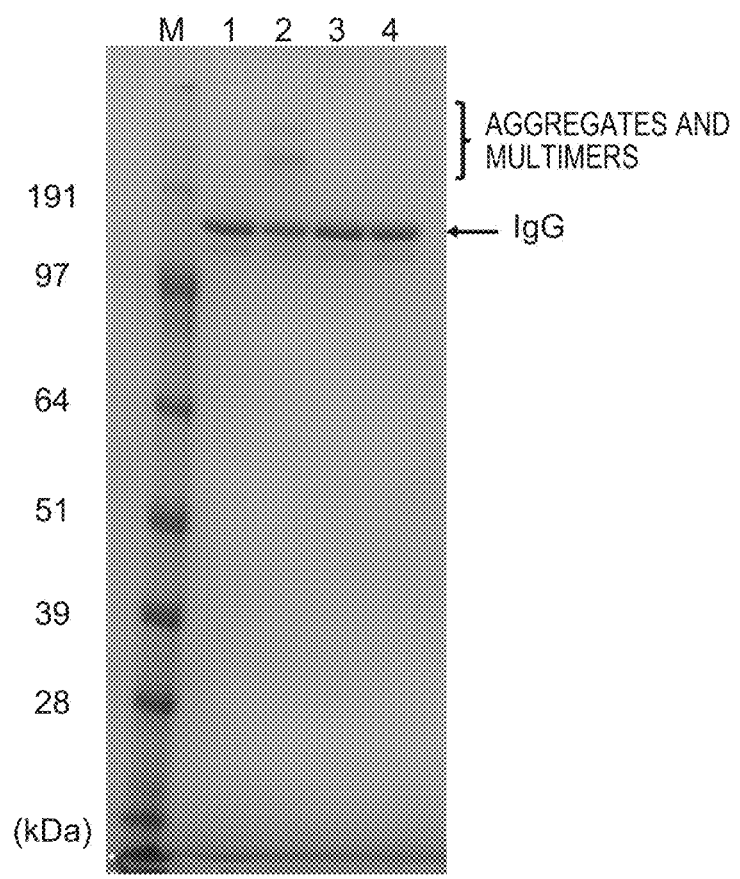
FIG. 10 is a diagram showing the result of SDS-PAGE in Example 6.

Also, the degrees of aggregation and multimerization of the protein in the ultraviolet-irradiated samples were evaluated by SDS-PAGE. FIG. 10 is a photograph of an SDS-PAGE gel, and the lanes show the results from the following samples.

Lane 1: Sample C1 (MVM+IgG 10 mg/mL, before irradiation)
Lane 2: Sample C1 (MVM+IgG 10 mg/mL, after irradiation)
Lane 3: Sample C2 (MVM+IgG 10 mg/mL+sodium ascorbate, before irradiation)
Lane 4: Sample C2 (MVM+IgG 10 mg/mL+sodium ascorbate, after irradiation)

As shown in FIG. 10, in the case of performing the ultraviolet irradiation without adding the radical scavenger (Lane 2), the presence of aggregates or multimers of the protein was observed. Meanwhile, in the case of adding the radical scavenger and then performing ultraviolet irradiation (Lane 4), these impurities were not detected.

As described above, it was confirmed that, even in the case of irradiating the sample solutions containing various proteins with ultraviolet rays, using the radical scavenger made it possible to maintain protein aggregation at a level that is not detected by SDS-PAGE while achieving sufficient virus inactivation.

Example 7

Evaluation of Inactivation of Different Virus and Protein Aggregation

Each of two types of samples, D1 and D2, was irradiated with ultraviolet rays, and the virus inactivation effect and protein aggregation were evaluated. The compositions of Samples D1 and D2 are as follows, and the method of preparing IgG to be used is the same as that in Example 1.

In this example, X-MuLV (xenotoropic murine leukemia virus, manufactured by ATCC, Catalog No. VR-1447) was used as the virus.
D1: 20 mM citrate buffer (pH 5.2) containing IgG at a final concentration of 1 mg/mL and X-MuLV at a final concentration of 5%
D2: 20 mM citrate buffer (pH 5.2) containing IgG at a final concentration of 1 mg/mL, X-MuLV at a final concentration of 5%, and 1 mM sodium ascorbate serving as a radical scavenger A deep ultraviolet LED (manufactured by DOWA Electronics Materials Co., Ltd., Product No. 280-FL-02-U04, peak wavelength: 280 nm) was used for ultraviolet irradiation.

Each of the sample solutions D1 and D2 was placed in a quartz cell (with two transparent sides), and the quartz cell was placed at a position 5 mm apart from the deep ultraviolet LED light source and irradiated with ultraviolet rays emitted from the deep ultraviolet LED for 120 seconds or 300 seconds. The irradiation energies of 120-second ultraviolet irradiation and 300-second ultraviolet irradiation were about 1530 mJ/cm$^2$ and 4183 mJ/cm$^2$, respectively, when being measured using an LED-measurement photodiode sensor (manufactured by Ophir, Product No. PD300M-UV) placed at a position 5 mm apart from the deep ultraviolet LED light source.

For each of the irradiated samples, the amount of the IgG monomer in the sample was quantified by performing gel filtration chromatography in the same manner as in Example 2. As a result, in the sample D1 to which the radical scavenger had not been added, the amount of the IgG monomer decreased by 38.2% due to the 120-second ultraviolet irradiation, and the amount of the IgG monomer decreased by 65.0% due to the 300-second ultraviolet irradiation. Meanwhile, in the sample D2 to which the radical scavenger had been added, a decrease in the amount of the IgG monomer was not observed after the 120-second ultraviolet irradiation, and the amount of the IgG monomer decreased only by 4.99% with 300-second ultraviolet irradiation.

Also, for each of the irradiated samples, the infectivity titer was calculated. Specifically, a 10-fold serial dilution series of each of the ultraviolet-irradiated samples was prepared using a McCoy's 5A medium (containing 2% FBS), and was added to a 96-well plate on which PG-4 (S+L−) cells had been seeded in advance. The plate was incubated at 37° C. and 5% CO$_2$ for 6 days, and then the infectivity titer (unit: TCID$_{50}$/mL) was calculated by checking cell degeneration. LRV was calculated based on the calculated infectivity titer in the same manner as in Example 1. As a result, it was confirmed that LRV was 2.50 or more in all cases where the samples D1 and D2 were irradiated with ultraviolet rays for 120 seconds and 300 seconds.

It was found from these results that 2 Log (99%) or more of X-MuLV could be inactivated by ultraviolet irradiation. In the case of adding no sodium ascorbate, the amount of the IgG monomer significantly decreased due to the ultraviolet irradiation, and it was inferred that a lot of aggregates or multimers were generated, but adding sodium ascorbate made it possible to suppress a decrease in the amount of the IgG monomer while maintaining the virus inactivation effect. Specifically, it was possible to suppress the amount of aggregates or multimers of IgG to 2% or less, or at least 5% or less.

As described above, it was confirmed that, even in the case of irradiating the sample solutions containing various types of viruses with ultraviolet rays, using the radical scavenger made it possible to suppress protein aggregation while achieving sufficient virus inactivation.

The invention is not limited to the foregoing embodiments, and various variations/changes are possible within the spirit of the invention.

What is claimed is:

1. A virus inactivation method comprising irradiating a solution containing an artificially expressed antibody or antibody fragment with ultraviolet rays in the presence of a radical scavenger, wherein
the irradiating only aggregates 5% or less of the antibody or antibody fragment,
a wavelength of the ultraviolet rays is 200 nm or longer and 315 nm or shorter,
an irradiation amount of the ultraviolet rays is 300 mJ/cm$^2$ or more,
an irradiation time of the ultraviolet rays is 3 minutes or less, and
a concentration of the radical scavenger in the solution is 0.03 mM or more.

2. The inactivation method according to claim 1, wherein the antibody or antibody fragment has been expressed in transgenic cells.

3. The inactivation method according to claim 1, wherein the radical scavenger is ascorbic acid, edaravone, or polyphenols.

4. The inactivation method according to claim 1, wherein the radical scavenger is ascorbic acid, edaravone, or epigallocatechin gallate.

5. The inactivation method according to claim 1, wherein a concentration of the antibody or antibody fragment in the solution is 20 mg/mL or less.

6. The inactivation method according to claim 1, wherein the irradiating includes irradiating the solution flowing in a channel with the ultraviolet rays.

7. The inactivation method according to claim 1, further comprising:
purifying the solution containing the antibody or antibody fragment by chromatography; and
further purifying, by chromatography, the solution containing the antibody or antibody fragment purified by chromatography and then irradiated with the ultraviolet rays.

8. The inactivation method according to claim 7, wherein the irradiating includes irradiating the solution containing the antibody or antibody fragment flowing in a channel for supplying a solution purified by chromatography for the further purifying with the ultraviolet rays.

9. The inactivation method according to claim 1, wherein the irradiating inactivates 99% or more of viruses.

10. A method for manufacturing an antibody drug or an antibody fragment drug comprising:
artificially expressing an antibody drug or an antibody fragment drug; and
inactivating viruses contained in a solution containing the artificially expressed antibody drug or antibody fragment drug by irradiating the solution with ultraviolet rays in the presence of a radical scavenger, wherein
the irradiating only aggregates 5% or less of the antibody or antibody fragment,
a wavelength of the ultraviolet rays is 200 nm or longer and 315 nm or shorter,
an irradiation amount of the ultraviolet rays is 300 mJ/cm$^2$ or more,
an irradiation time of the ultraviolet rays is 3 minutes or less, and
a concentration of the radical scavenger in the solution is 0.03 mM or more.

11. The inactivation method according to claim 1, wherein the irradiating comprises irradiation with ultraviolet rays using an apparatus for inactivating viruses, wherein the apparatus comprises:
a channel having an inlet and an outlet for a solution containing a protein and an ultraviolet-transmitting portion provided in at least a portion between the inlet and the outlet; and
a light source for emitting ultraviolet rays to the ultraviolet-transmitting portion.

12. A system for purifying a solution containing an artificially expressed antibody or antibody fragment, comprising:
a first purification unit configured to purify the solution containing the artificially expressed antibody or antibody fragment by chromatography;
a virus inactivation unit configured to irradiate the solution containing the antibody or antibody fragment resulting from the first purification unit with ultraviolet rays in the presence of a radical scavenger, the virus inactivation unit comprising:
a channel having an inlet and an outlet for the solution and an ultraviolet-transmitting portion provided in at least a portion between the inlet and the outlet; and
a light source configured to emit ultraviolet rays to the ultraviolet-transmitting portion; and
a second purification unit configured to further purify, by chromatography, the solution containing the antibody or antibody fragment irradiated with the ultraviolet rays by the inactivation unit, wherein
the irradiation of the solution containing the antibody or antibody fragment by the inactivation unit only aggregates 5% or less of the antibody or antibody fragment,
a wavelength of the ultraviolet rays is 200 nm or longer and 315 nm or shorter,
an irradiation amount of the ultraviolet rays is 300 mJ/cm$^2$ or more,
an irradiation time of the ultraviolet rays is 3 minutes or less, and
a concentration of the radical scavenger in the solution is 0.03 mM or more, and
the outlet of the channel of the inactivation unit is connected to an inlet of a column for the chromatography which the second purification unit comprises.

* * * * *